No. 795,672. PATENTED JULY 25, 1905.
F. H. WILLMS.
SIDEHILL HARVESTER.
APPLICATION FILED MAR. 15, 1905.
2 SHEETS—SHEET 1.
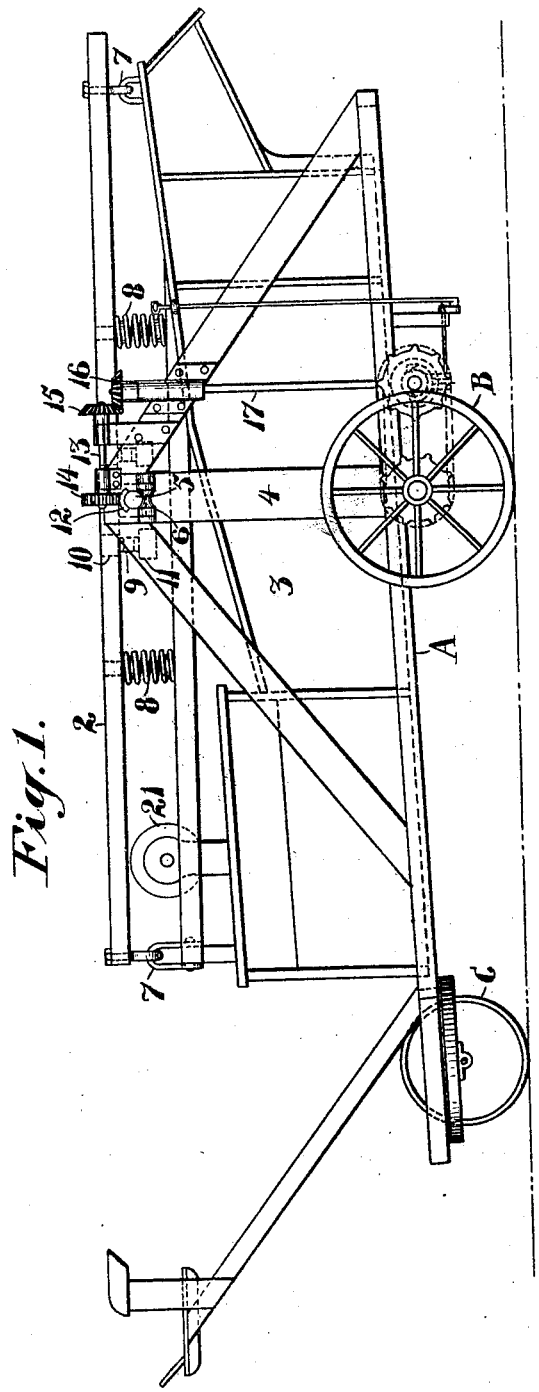
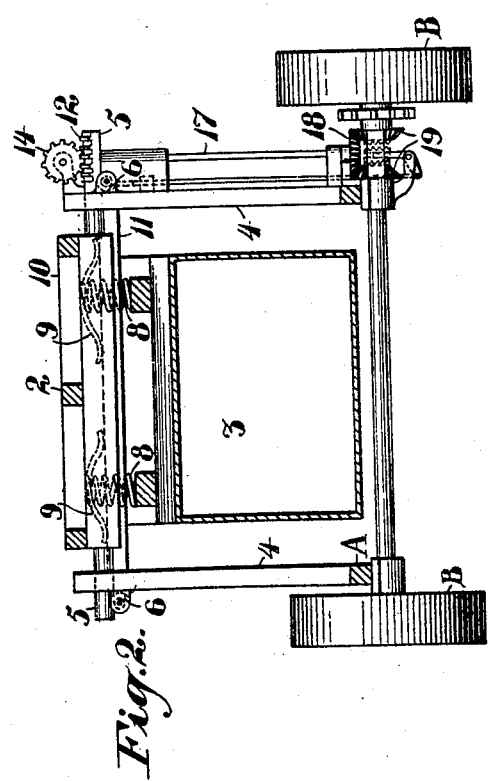
Witnesses:
F. C. Fliedner
Inventor,
Frederick H. Willms
By Geo. H. Strong, Atty.

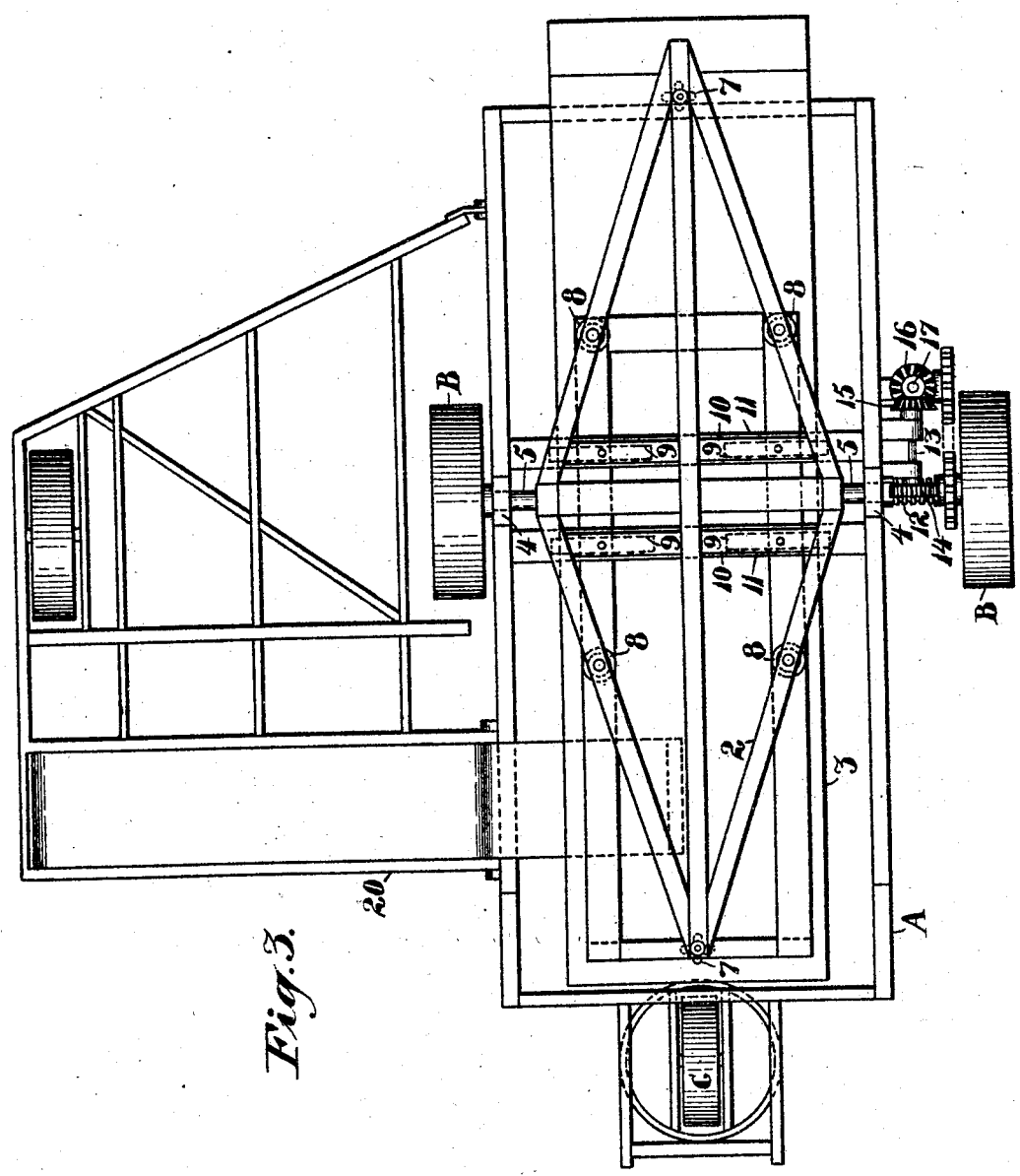

UNITED STATES PATENT OFFICE.

FREDERICK H. WILLMS, OF KNIGHTS FERRY, CALIFORNIA.

SIDEHILL-HARVESTER.

No. 795,672.    Specification of Letters Patent.    Patented July 25, 1905.

Application filed March 15, 1905. Serial No. 250,159.

*To all whom it may concern:*

Be it known that I, FREDERICK H. WILLMS, a citizen of the United States, residing at Knights Ferry, in the county of Stanislaus and State of California, have invented new and useful Improvements in Sidehill-Harvesters, of which the following is a specification.

My invention relates to an apparatus for the cutting of grain and like products; and it is particularly designed to maintain the threshing and cleaning portion of the mechanism in a substantially horizontal position, both transversely and longitudinally, and independent of any variations in the grade of the land which is being passed over by the machine.

It consists in the combination of devices by which the body of the machine is allowed to swing by gravitation while the wheel-frame and other parts are subjected to movement caused by inequalities of the land.

It also comprises details of construction, which will be more fully explained by reference to the accompanying drawings, in which—

Figure 1 is a side elevation of a harvester, showing my invention. Fig. 2 is a transverse section of same. Fig. 3 is a plan view of the framework.

Various machines have been designed for the purpose of maintaining the threshing and cleaning mechanism of harvesters in a more or less horizontal position transversely and with relation to the inequalities of the land which is being traveled over. These mechanisms have been especially designed to compensate for such inequalities as are transverse to the line of travel of the machine, making it necessary to have the machine travel in lines approximately at right angles with the inclination of the hill, there being no provision for leveling the machine in the direction of its line of travel.

It is the object of my invention to provide a universal leveling mechanism properly supported from the wheel-base and frame and capable of universal movement to suit any variations or inequalities in the land, and upon this portion of the apparatus the threshing-cylinders and the cleaning-shoe and connected mechanism are carried.

In the present drawings I have only illustrated a sufficient portion of a well-known traveling harvester to show my invention.

A is the main or wheeled frame, constructed of sufficiently strong timbers suitably connected together and mounted upon the rear bearing-wheels, as B, and the front steering-wheel, as at C. The side timbers of the frame A are sufficiently separated to admit of the suspended frame 2, within which the threshing and cleaning mechanism of the apparatus may be carried. The frame 2 is sufficiently narrower than the frame A so that it may swing down between the side timbers of said frame and have a sufficient amount of space upon either side to allow it to swing for all ordinary inequalities of land-surface without coming in contact with the side frames A. Where the inequality is too great and it is not desirable to further increase the width between the said frames A, I have shown a means for moving the suspended frame 2 toward the side which is the highest, so that the lower portion of this frame may swing toward the other side sufficiently to maintain its horizontal position and without contacting with these side frames A.

The body or box portion 3 of the apparatus and which contains the threshing and cleaning mechanism is supported from the yoke or frame 2, which is in turn carried upon uprights 4, fixed to the wheel-frame A. The transverse timbers of the frame 2 are extended in the form of shafts or journals, as at 5, and these shafts or journals are supported upon concaved rollers 6, the concavity of the rollers corresponding substantially to the cylindrical curvature of these shaft ends. The object of the roller-bearings is to allow the shaft to be moved in the direction of its length when required, and the concavity of the rollers allows the shaft to turn upon its center when the machine is passing over ground where the direction of inclination is in the direction of travel of the machine.

The frame 2 as I have here shown it is of diamond shape, and the casing 3 of the machine is suspended by links or connections 7 substantially central of the width of the box 3, so that being suspended from these links the box will hang normally vertical, while by reason of the frame 2 being tiltable upon its shaft 5 the frame and the box may tilt longitudinally, and thus these two movements or combinations of them will maintain the swinging box always level whatever may be the change of position of the wheel-base.

As it is necessary to prevent the apparatus from swinging too freely and to hold it measurably steady, but at the same time sufficiently yielding, so that the weight of the apparatus will cause it to maintain approximately a horizontal position, I have shown stout springs, as at 8, located between the frame 2 and timbers transverse of the box 3 and at points upon either side of the line of suspension of the box, so that as the wheel-base may be tilted to one side or the other the suspended box 3 will by its weight compress the springs upon one side of the line of suspension, while those upon the other side will extend, and between the two the box will be maintained with sufficient steadiness. The movement in the direction of the length is controlled by springs 9, located upon each side of the supporting-shaft 5. These springs may be of any suitable or desired form; but because it is desirable to move the shaft 5 endwise I have shown the springs 9 as being clipped or secured to timbers 10, which are parallel with the shaft and at a sufficient distance upon each side thereof. The springs that I have here shown are semi-elliptic springs having ends clamped to the timbers 10 and the central and convex portion provided with shoes or other antifrictional devices which are adapted to move upon timbers 11, these timbers extending between and being properly supported from the fixed posts 4, so that as the wheel-base becomes inclined in the direction of its length the springs 9 upon one side of the center will be compressed and those upon the other side will be correspondingly extended. It will be understood that all of the springs 8 9, whatever may be their character, will be very considerably compressed when the apparatus is standing upon a level, so that a considerable pressure will be brought upon the parts, and when running on a level the suspended box will be maintained very steady.

The distance between the side timbers A of the wheel-base cannot be unduly great, and upon steep hillsides it is necessary to provide some means for allowing the box 3 to swing sufficiently to maintain itself level without coming in contact with these side timbers. This I effect by moving the shaft 5 in the direction of its length, and as this must be effected without interfering with its ability to turn if the machine tilts in the direction of its length I have shown the following arrangement: Upon the upper side shaft 5 is formed a rack 12. It will be seen that by turning a pinion 14 in one direction the shaft, being mounted upon the roller 6, can be slid along in the direction of its length. Thus upon a hillside the shaft being moved toward the hillside the body 3 will be moved with it on account of being suspended therefrom, and the lower side of the body may thus swing toward the opposite or downhill side without coming in contact with the frame-timber 9 of that side of the machine. If the machine tilts in the other direction, the same adjustment may be made in the opposite way. In order to operate this mechanism and because the suspended portion will be very heavy, I have shown a bevel-gear 15 upon the end of the shaft 13. This is engaged by a pinion 16 upon a vertical shaft 17. The lower end of this shaft 17 carries a pinion 18, and this pinion may be acted upon by a reversible clutch of any well-known or suitable description. A clutch of this sort is herein illustrated, and the beveled gears 19 are loosely turnable upon a shaft which may be actuated directly from the main bearing-wheel B. The clutch moving centrally upon a feather between these gears and having a suitable lever by which it may be moved, it will be seen that when moved into engagement with one of the gears 19 it will act to turn the gear 18, shaft, and connected mechanism in one direction, and when moved into contact with the other gear it will turn the parts in the other direction. Thus an operator conveniently located upon the machine may control these movements and shift the box 3 to either side, according to the conditions of the surface.

The heading portion of the machine 20 is hinged to the side of the wheel-frame A in any usual or suitable manner, and the traveling belt or draper upon which the cut straw falls and by which it is carried up and delivered into the threshing portion of the apparatus will be supported from the wheel-frame, so that its movements may not be dependent upon or interfere with the movements of the part 3. Thus by a suitable roller-support carried upon the frame A the header-spout being hinged to the header-frame in the usual manner will be allowed to move in the direction of its length to suit such changes of movement as are continually taking place between the threshing-machine wheel-frame and the header-frame, and in addition to this the end of the spout projecting through or over the open side of that part of the apparatus known as the "feed-house" and which is a portion of the part 3 will allow the parts to move independently of each other, and the straw will be properly delivered into the feed-house to be carried and delivered to the threshing-cylinder, thence passing through the apparatus usual for this purpose. The telescopic feeder-spout allows perfect compensation.

I have not here shown any detailed portions of the mechanisms common to threshing-machines, and they will not differ materially from those in common use.

In order to transport the machine over the ground, either a team of horses of sufficient strength may be attached to the front of the frame A by the usual connections and guided by a driver, whose seat is carried upon a projecting frame which is supported from the wheel-frame A, or it may be hauled by a traction-engine or other motor. The power thus applied is sufficient to haul the machine, and through connections with one of the bearing-wheels B power is transmitted to drive the sickle and the carrying-belt of the header.

In order to drive the threshing, cleaning, and other mechanism carried within the box or casing 3, I employ a motor of any suitable description. I have found that a gasolene-engine is a very suitable motor for this purpose, and such an engine is carried by the movable self-leveling frame 2 and preferably supported directly from the universally-movable box 3. An engine of this description is shown at 21, and it should be so disposed upon the frame that its weight, the weight of the threshing-cylinder, and the other moving and stationary parts will be so balanced that these parts will remain normally level when the whole apparatus is upon horizontal ground, and the swinging of the carrying-frame 2 and the box beneath it will always maintain these parts with proper relation to each other. It will be seen that any belt or other connections from the engine to drive the cylinder, the carrying-belts, fan, and other mechanism of the thresher and cleaner will always be maintained at the proper tension because the movements of all these parts are in unison.

Having thus described my invention, what I claim, and desire to secure by Letters Patent, is—

1. An improved harvester having in combination, a wheeled frame having standards, a frame having supporting-shafts upon which it is tiltable in a longitudinal direction, a casing containing a threshing and cleaning mechanism and suspending devices connecting it with the tiltable frame to allow of the transverse movements of the casing.

2. In a harvester, a wheel-frame, standards supported thereon, a frame having pivot-shafts supported upon the standard, and tiltable in the direction of the length of the frame, springs upon which said frame rests upon each side of the shaft, a casing containing threshing and cleaning mechanism and suspending devices connecting said casing with the tilting frame to allow transverse movements of the casing, and springs located between the casing and the tilting frame.

3. In a harvester, a wheel-frame, standards thereon, a casing containing threshing and cleaning mechanism, a frame from which said casing is suspended so as to tilt transversely of the machine, shafts by which the tilting frame is supported upon the standards and means by which the tilting frame may be shifted transversely to allow the swinging casing to tilt without striking the sides of the wheel-frame.

4. In a harvester, a wheel-frame having vertical standards, a casing containing threshing and cleaning mechanism, a frame having a shaft extending transversely and tiltably supported upon the standards, suspending connections between the casing and the tilting frame to allow the casing to tilt transversely, a rack carried upon the shaft, a pinion engaging said rack and mechanism through which motion is communicated to move the shaft in the direction of its length and shift the swinging casing to either side.

5. In a traveling harvester, a wheel-frame having standards, a longitudinally-tiltable and transversely-adjustable frame supported upon said standards, a threshing and cleaning mechanism, a casing in which said mechanism is inclosed, suspending devices between the casing and the tilting frame whereby the casing is allowed to swing transversely, a header hinged to the side of the main frame having a carrying-belt and header-spout by which material is delivered to the threshing mechanism, and supports upon the main frame for said header-spout independent of the swinging and tiltable mechanism.

In testimony whereof I have hereunto set my hand in presence of two subscribing witnesses.

FREDERICK H. WILLMS.

Witnesses:
 HENRY P. TRICOU,
 S. H. NOURSE.